United States Patent [19]

Liang et al.

[11] Patent Number: 5,758,073

[45] Date of Patent: May 26, 1998

[54] SERIAL INTERFACE BETWEEN DSP AND ANALOG FRONT-END DEVICE

[75] Inventors: Jie Liang; Reginald Wee, both of Singapore, Singapore

[73] Assignee: Tritech Microelectronics International, Ltd., Singapore, Singapore

[21] Appl. No.: 755,872

[22] Filed: Dec. 2, 1996

[51] Int. Cl.$^6$ .................................................. G06F 13/42
[52] U.S. Cl. .................................. 395/200.6; 395/200.38; 395/200.67; 395/285
[58] Field of Search ........................ 395/200.38, 200.6, 395/200.61, 200.62, 200.66, 200.67, 285

[56] References Cited

U.S. PATENT DOCUMENTS

| | | | |
|---|---|---|---|
| 4,346,440 | 8/1982 | Kyu et al. ........................... | 395/200.66 |
| 4,845,609 | 7/1989 | Lighthart et al. ................... | 395/200.3 |
| 5,321,819 | 6/1994 | Szczepanek ......................... | 395/200.58 |
| 5,467,774 | 11/1995 | Ochs et al. .......................... | 128/711 |
| 5,491,492 | 2/1996 | Knapp et al. ........................ | 345/8 |

*Primary Examiner*—Ayaz R. Sheikh
*Assistant Examiner*—Jeffrey K. Seto
*Attorney, Agent, or Firm*—George O. Saile; Stephen B. Ackerman

[57] ABSTRACT

A system to transfer a serial digital data protocol between a controlling processor such as digital signal processor and a plurality of analog front-end devices is described. The system has a serial clock unit to generate a serial clock reference signal, a serial data control unit to create the serial data protocol, a serial clock transmission medium, a serial data transmission medium, and an analog front-end control unit. The serial digital data protocol has a start bit time, an address time, a read/write bit time, a first high impedance time, a serial data word time, a second high impedance time, and a stop bit time. A serial data word may be transferred either from the controlling processor to the analog front-end device or from the analog front-end device to the controlling processor dependent on the state at the read write bit time.

20 Claims, 5 Drawing Sheets

SERIAL INTERFACE BETWEEN DSP AND ANALOG FRONT-END DEVICE

BACKGROUND OF THE INVENTION

1. Field Of The Invention

This invention relates to the transfer of digital information between two devices and in particular the synchronous transfer of digital information on a two wire interface between a digital signal processor and an analog front-end device.

2. Description of Related Art

The ability to transfer digital information between two devices such as a digital signal processor (DSP) and an analog front-end device has been well considered in the art.

Two important methods for this transfer have been the use of a parallel bus and an asynchronous serial data bus. In a parallel bus, multiple data bits of a digital word of information are transferred simultaneously. This requires that both devices have a connection for each data bit within the digital word. As the information word grows in size, the number of connections adds complexity to the physical design and the electrical design is impacted by the additional noise generated by multiple circuits being switched in the parallel bus.

An asynchronous serial bus will have the data bits of the digital word placed in sequential order in time and transferred on a single interface. The digital word is transmitted by the sending device at a speed and with a timing specified by the design of the sending device. The receiving device will have complex circuitry to extract the timing of the sending device and synchronize its own receiving circuitry to capture the digital word. The receiving circuitry then must synchronize the digital word such that it can be used by the receiving device.

A typical asynchronous interface is the Electronics Industry Association's (EIA) specification for the RS-232. This interface has a serial transmission path, a serial reception path, and several control paths to perform the necessary "hand shaking" functions between the transmitting and receiving devices to insure that the digital word is transferred correctly.

Another important method for the transfer of digital information is a synchronous serial bus protocol. In this technique the digital word is again placed in time sequential order to be transferred over a serial interface. However, with the serialized data a clock is also passed with the data to allow the receiving system to capture the data without the complexity of special circuitry to synchronize the receiving circuits.

An example of a synchronous serial interface protocol is the Inter-Integrated Circuits Bus (I²C) developed by Philips Semiconductor a subsidiary of North American Philips Corporation. The I²C bus has a single bi-directional data line for the transfer of address, data, and control information and a clock line to synchronize the transfer of the digital word. The control of the I²C bus is with a "master" device which generates the clock and will determine the address and will determine the address and control information. The data can be transmitted to a "slave" device by the "master" device or received by the "master" device from the "slave" device. Each transmission is simplex or one way communication with the master determining the source.

Another example of a synchronous serial interface is the three wire communication interface of the DS1620 and DS1621 Digital thermometer and thermostat from Dallas Semiconductor Corporation. The three wire communication interface has a clock line, and an Input/Output data line, and a reset line. A "master" control transfer control, address and data information to the "slave" digital thermometer and thermostat. The master controller receives the data from the "slave" digital thermometer and thermostat. The master controller generates the clock signal and a reset signal that synchronizes and controls the activation of the transfer of address, control, and data between the "master" controller and the "slave" digital thermometer and thermostat.

Other synchronous serial interfaces such as the Serial Peripheral Interface (SPI) and the Serial Communications Interface (SCI) from Motorola Incorporated have a separate data transmission line, a separate data reception line, as well a clock control line. This structure will allow for the transmission and reception of data synchronously in a full duplex or a simultaneous two way communication. The clock control line will have a clock that originates from a "master" controller which will control the transfer of data between the master controller and each of the "slave" devices. In this structure, communications will take place between "slave" devices as well as with the "master" controller.

U.S. Pat. No. 5,467,774 (Ochs, et al.) describes a method for the precise time base presentation of medical data. Said medical data may be transferred between electronic medical devices using a serial interface.

U.S. Pat. No. 5,491,492 (Knapp, et al.) describes a method for tracking the position of each eye of a human operator. The information regarding said position of each eye may be transferred to a controller through a serial interface.

SUMMARY OF THE INVENTION

An object of this invention is the synchronous transfer of serial digital data. To accomplish this and other objects, a system will synchronously transmit and receive a serial digital data protocol between a controlling processor and plurality of analog front-end devices. The system has a system clocking unit to generate a reference clocking signal of equal repetitive time periods. The reference clocking signal is transported on the system clocking transmission medium that is coupled between the controlling processor and the plurality of analog front-end devices. A system data control unit generates the serial digital data protocol with the control processor. The serial digital data protocol is transported between the controlling processor and the plurality of analog front-end devices on the digital data transmission medium.

An analog front-end control unit, within each of the analog front-end devices, receives the serial digital data protocol and based on the information present with said serial digital data protocol will receive or transmit a serial digital data word from or to the controlling processor.

The serial digital data protocol has a start bit time to identify the beginning of a transmission, followed by an address code word to select one of the plurality of analog front-end devices. Next in sequence is a command bit that will direct a specific analog front-end device selected by the address code word to either transmit or receive the serial digital data word. This is followed by a high impedance time to allow the specific analog front-end device to prepare to either transmit or receive the serial digital data word. The serial digital data word is then placed on the digital data transmission medium. After the serial digital data word has been transferred, a second high impedance time follows to allow the analog front-end device that may have been transmitting a serial digital data word to prepare to receive the next serial digital data protocol. Finally a serial stop bit time signals the end of a transmission of the serial digital data protocol.

DETAILED DESCRIPTION OF THE INVENTION

Figure 1:
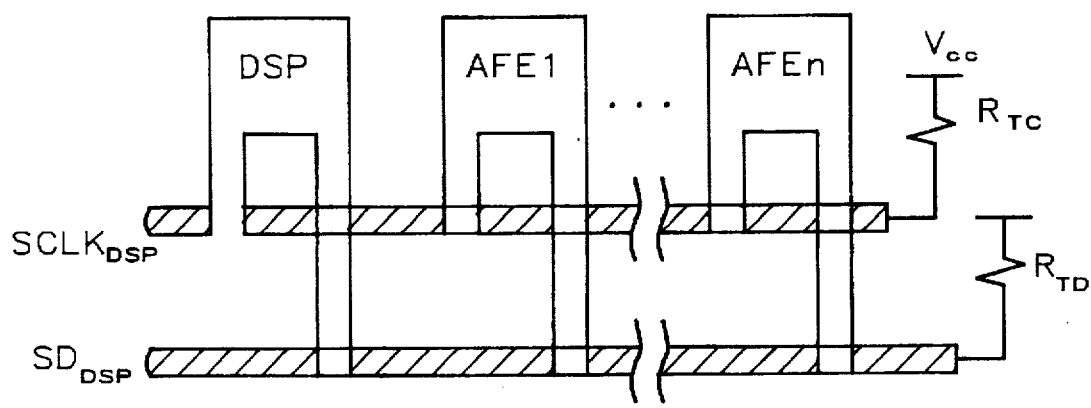
FIG. 1 is a block diagram of a system configuration for this invention

The block diagram shown in FIG. 1 is a representative system incorporating a controlling processor such as a DSP, and a plurality of analog front-end devices $AFE_1, \ldots, AFE_n$. The controlling processor DSP and the plurality of analog front-end devices $AFE_1, \ldots, AFE_n$ are interconnected with the serial interface of this invention. The analog front-end devices $AFE_1, \ldots, AFE_n$ may be such telemetric devices as temperature sensors, strain gages, light sensors, or rotational velocity sensors, or the analog front-end devices $AFE_1, \ldots, AFE_n$ may be activation apparatus such as solenoid activator, motor drivers, or display drivers. Additionally the analog front-end devices $AFE_1, \ldots, AFE_1$ may also be communication devices such as modems and digital-to-analog converters.

The controlling processor DSP will generate a clocking signal SCLK that is a repetitive periodic digital signal. The clocking signal SCLK will be transferred on the serial clocking bus $SCLK_{DSP}$ to each of the analog front-end devices $AFE_1, \ldots, AFE_1$.

The terminating resistors $R_{TC}$ and $R_{TD}$ are coupled between a power supply voltage source $V_{cc}$ and the serial clocking bus $SCLK_{DSP}$ and the serial data bus $SD_{DSP}$ respectively. The terminating resistors $R_{TC}$ and $R_{TD}$ are optional and will provide electrical termination for the electrical signals on the serial clocking bus $SCLK_{DSP}$ and the serial data bus $SD_{DSP}$.

Figure 2A:
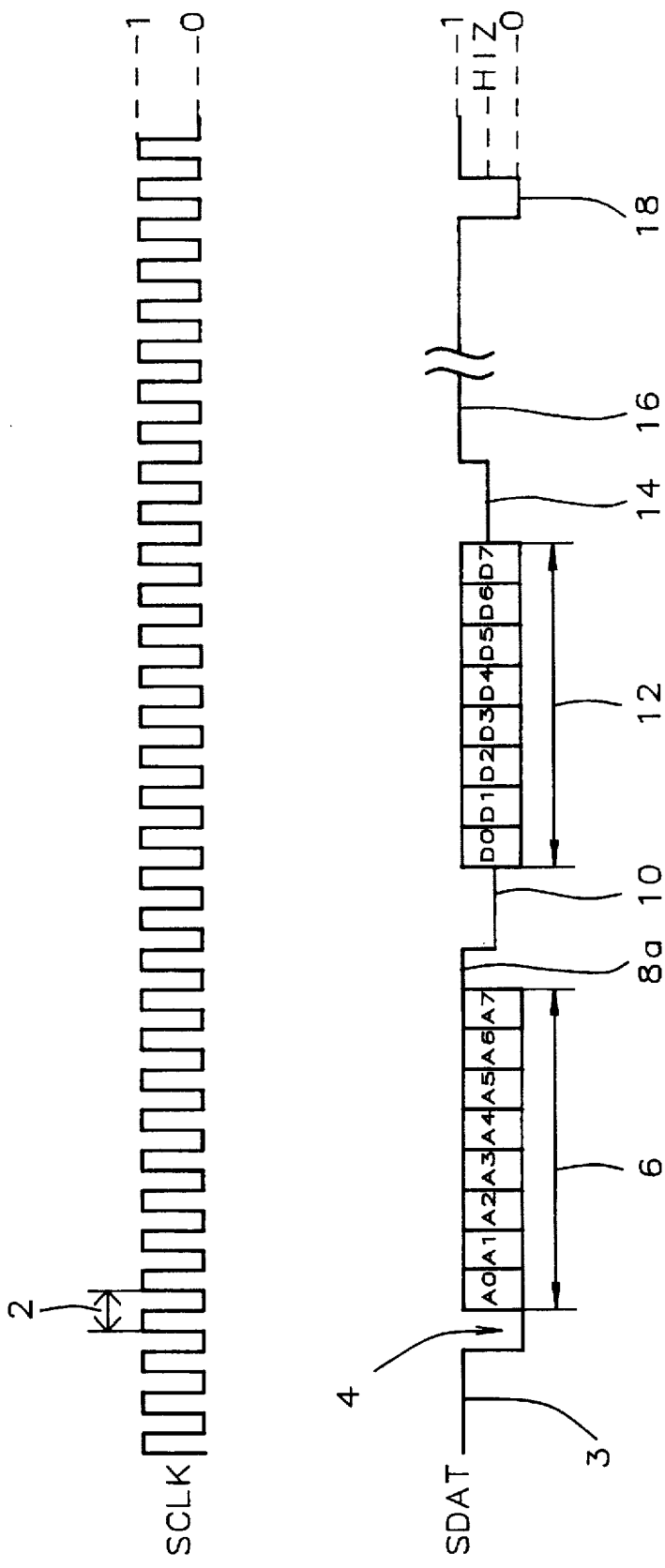
FIG. 2a is a timing diagram of the serial write timing of this invention.
Figure 2B:
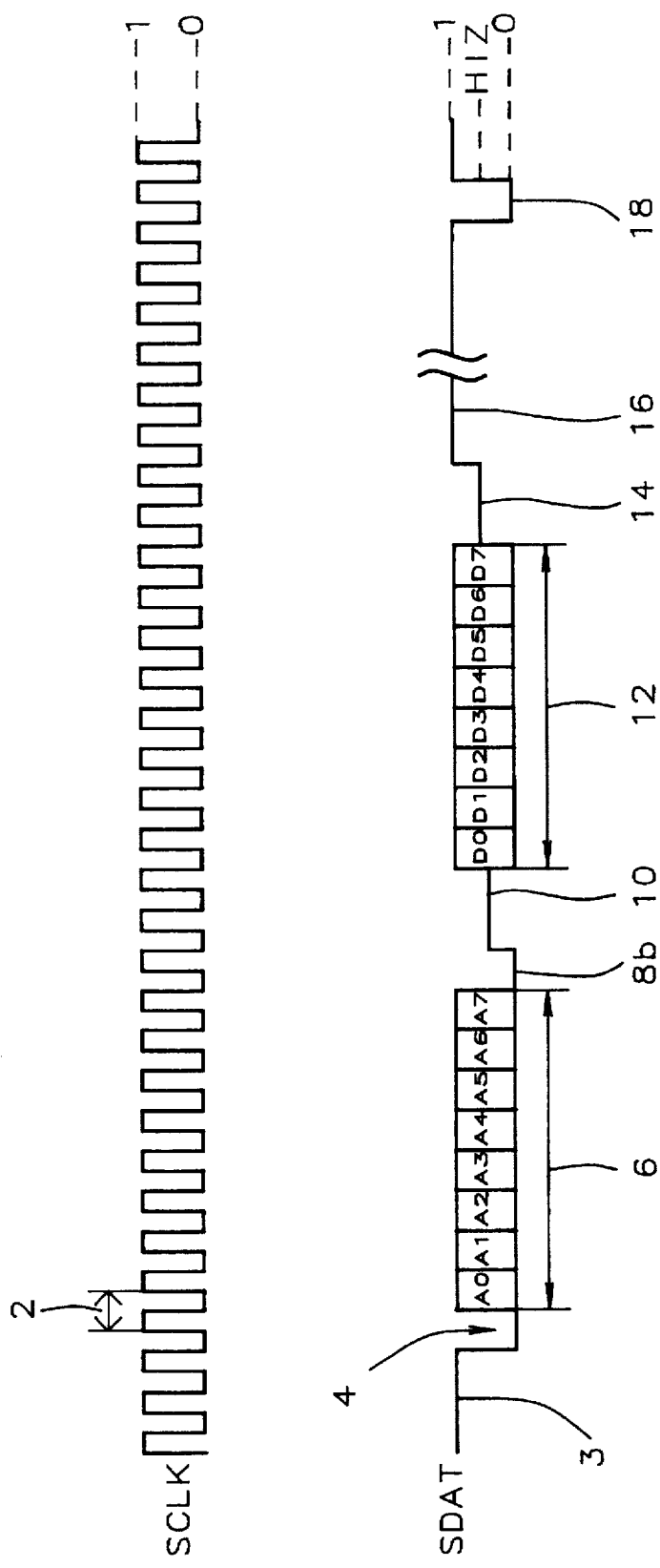
FIG. 2b is a timing diagram of the serial read timing of this invention.
Figure 2C:
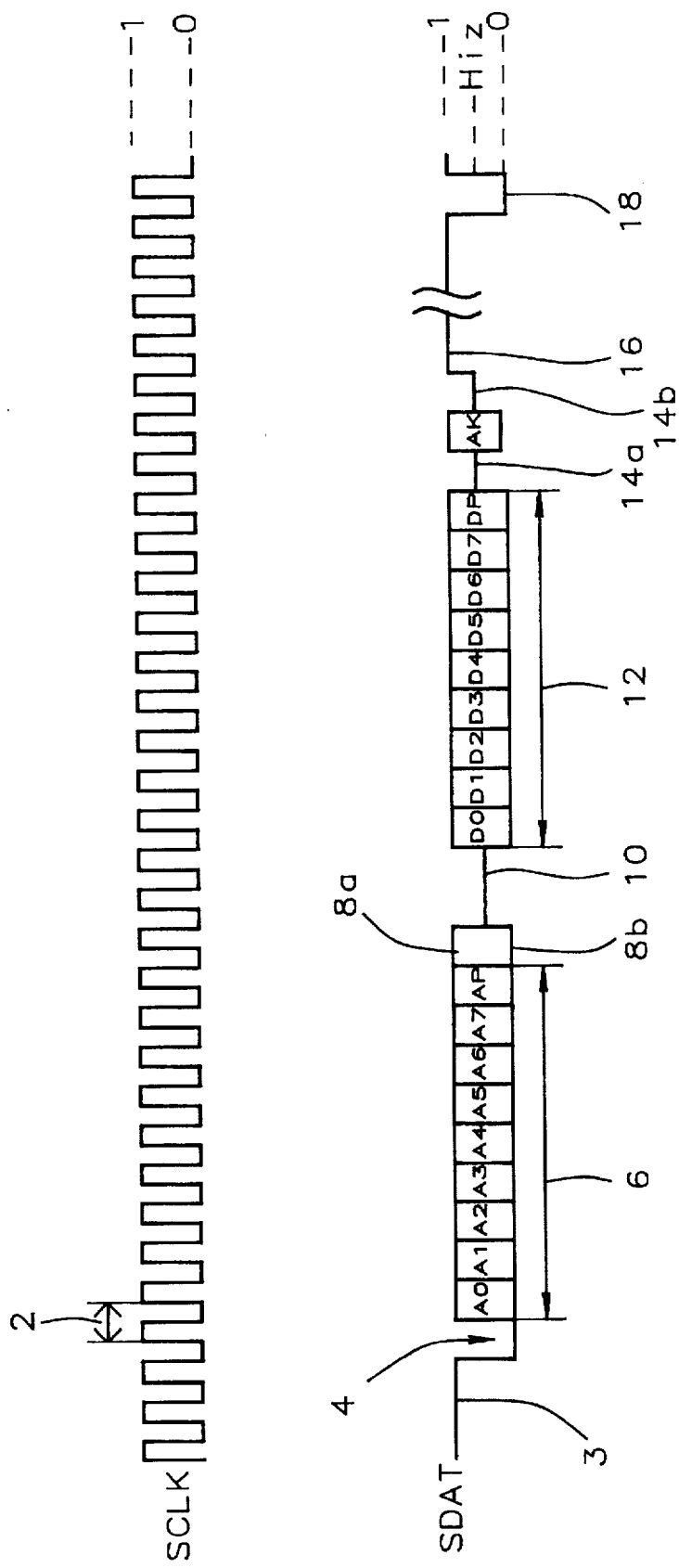
FIG. 2c is a timing diagram of the serial read/write timing of an extension of the protocol of this invention.

FIGS. 2a, 2b and 2c are timing diagrams for the protocol for the serial interface of this invention. FIG. 2a shows the serial data write protocol wherein the controlling processor DSP of FIG. 1 is writing data to the analog front-end devices $AFE_1, \ldots, AFE_n$ of FIG. 1. The serial clock $SCLK_{DSP}$ has a cyclic period that is time 2. The data bus $SD_{DSP}$ may change state during a transition from a first logic level 1 to a second logic level 0 and have completed this transition and assumed a steady state by the time of the transition from the second logic level 0 to the first logic level 1.

Prior to the start of any transfer on the serial interface, the serial data bus $SD_{DSP}$ of FIG. 1 is held at the first logic level 1. The state of the transfer on the serial interface is signaled by the transition of the serial data bus $SD_{DSP}$ to the second logic level 0 at the time 4. The time 4 is for one for one period 2 of the serial clock $SCLK_{DSP}$.

During the time 6 an address $A_0, \ldots, A_7$ is transferred to the analog front-end devices $AFE_1, \ldots, AFE_n$ of FIG. 1. The address identifies the particular analog front-end devices $AFE_1, \ldots, AFE_n$ that is be included in the transfer of data between the controlling processor DSP of FIG. 1.

At the time 8a the serial data bus $SD_{DSP}$ will assume the first logic level 1 to indicate that the controlling processor DSP of FIG. 1 will be transmitting data to the analog front-end device $AFE_1, \ldots, AFE_n$ of FIG. 1 identified by the address $A_0, \ldots, A_7$. Next during the period 10, which will be for two clock periods 2 in the preferred implementation, the serial data bus $SD_{DSP}$ may of the first logic level 1, the second logic level 2 or an intermediate high impedance state HiZ. The analog front-end devices $AFE_1, \ldots, AFE_n$ of FIG. 1 will not accept any transfer from the controlling process DSP of FIG. 1 during the time period 10, nor will the controlling processor DSP of FIG. 1 accept any transfer from the analog front-end devices $AFE_1, \ldots, AFE_n$ so as to prevent any contention between the controlling processor DSP and the analog front-end devices $AFE_1, \ldots, AFE_n$.

During the time period 12, the serial data $D_0, \ldots, D_7$ is placed on the serial data bus $SD_{DSP}$ of FIG. 1 and transferred to the analog front-end device $AFE_1, \ldots, AFE_n$ of FIG. 1. After the end of the digital data $D_0, \ldots, D_7$, during the period 14, the serial data bus $SD_{DSP}$ may again of the first logic level 1, or the second logic level 0, or an intermediate high impedance state HiZ. During the time period 10, the analog front-end devices $AFE_1, \ldots, AFE_n$ of FIG. 1 will not accept any transfer from the controlling process DSP of FIG. 1, nor will the controlling processor DSP of FIG. 1 accept any transfer from the analog front-end devices $AFE_1, \ldots, AFE_1$.

At time 16, the serial data bus $SD_{DSP}$ will be brought to the first logic level 1 indicating the end of the transmission. The serial data bus $SD_{DSP}$ will remain at the first logic level 1 until the next start of a transfer at time 18.

Examining FIG. 2b, the operation of the serial data read protocol is identical to the aforementioned serial data protocol write protocol of FIG. 2a, except at time 8b the serial data bus $SD_{DSP}$ is brought to the second logic level 0 to indicate that the analog front-end device $AFE_1, \ldots, AFE_n$ of FIG. 1 that is selected by the address $A_0, \ldots, A_7$ will be transferring the serial data $D_0, \ldots, D_7$ to the controlling processor DSP of FIG. 1. During the time period 10, the serial data must now be at the intermediate high impedance state HiZ, which allows the selected analog front-end device $AFE_1, \ldots, AFE_n$ of FIG. 1 to prepare to transfer the serial data $D_0, \ldots, D_7$ to the controlling processor DSP of FIG. 1. At the completion of the transfer of the serial data signal $D_0, \ldots, D_7$ at time 14, the serial data bus $SD_{DSP}$ is again at the intermediate high impedance state HiZ to allow the controlling processor DSP of FIG. 1 to reassert control of the serial data bus $SD_{DSP}$.

FIG. 2c is a combination of the timing diagrams FIGS. 2a and 2b showing the addition of the address parity bit $A_P$ to the address $A_0, \ldots, A_7$ during time period 6 and the addition of the serial data parity bit $D_P$ to the serial data $D_0, \ldots, D_7$ during the time period 12. The parity bits $A_P$ and $D_P$ would be created and manipulated as standard parity generation and checking with in the controlling processor DSP or the of FIG. 1 and the selected analog front-end device $AFE_1, \ldots, AFE_n$ of FIG. 1, which is well known in the art.

An acknowledge bit AK would be sent by the selected analog front-end device $AFE_1, \ldots, AFE_n$ of FIG. 1 after the receipt of the serial data $D_0, \ldots, D_7, D_P$ from the controlling processor DSP of FIG. 1 at time 20. If the selected analog front-end device $AFE_1, \ldots, AFE_n$ of FIG. 1 does not receive the serial data $D_0, \ldots, D_7, D_P$ correctly, it would not transmit the acknowledge AK and the controlling processor DSP of FIG. 1 will repeat the serial data $D_0, \ldots, D_7, D_P$ until the selected analog front-end device $AFE_1, \ldots, AFE_n$ transmits the acknowledge AK signal indicating the successful reception of the serial data $D_0, \ldots, D_7, D_P$. This allows for error correction by redundant transmission of the serial data $D_0, \ldots, D_7, D_P$ to improve the reliability of the serial interface.

The period of time 14 of FIGS. 2a and 2b is now divided into two periods 14a and 14b. This will prevent the controlling processor DSP or the selected analog front-end device $AFE_1, \ldots, AFE_n$ of FIG. 1 from contending for control of the serial data interface SDAT.

Figure 3:
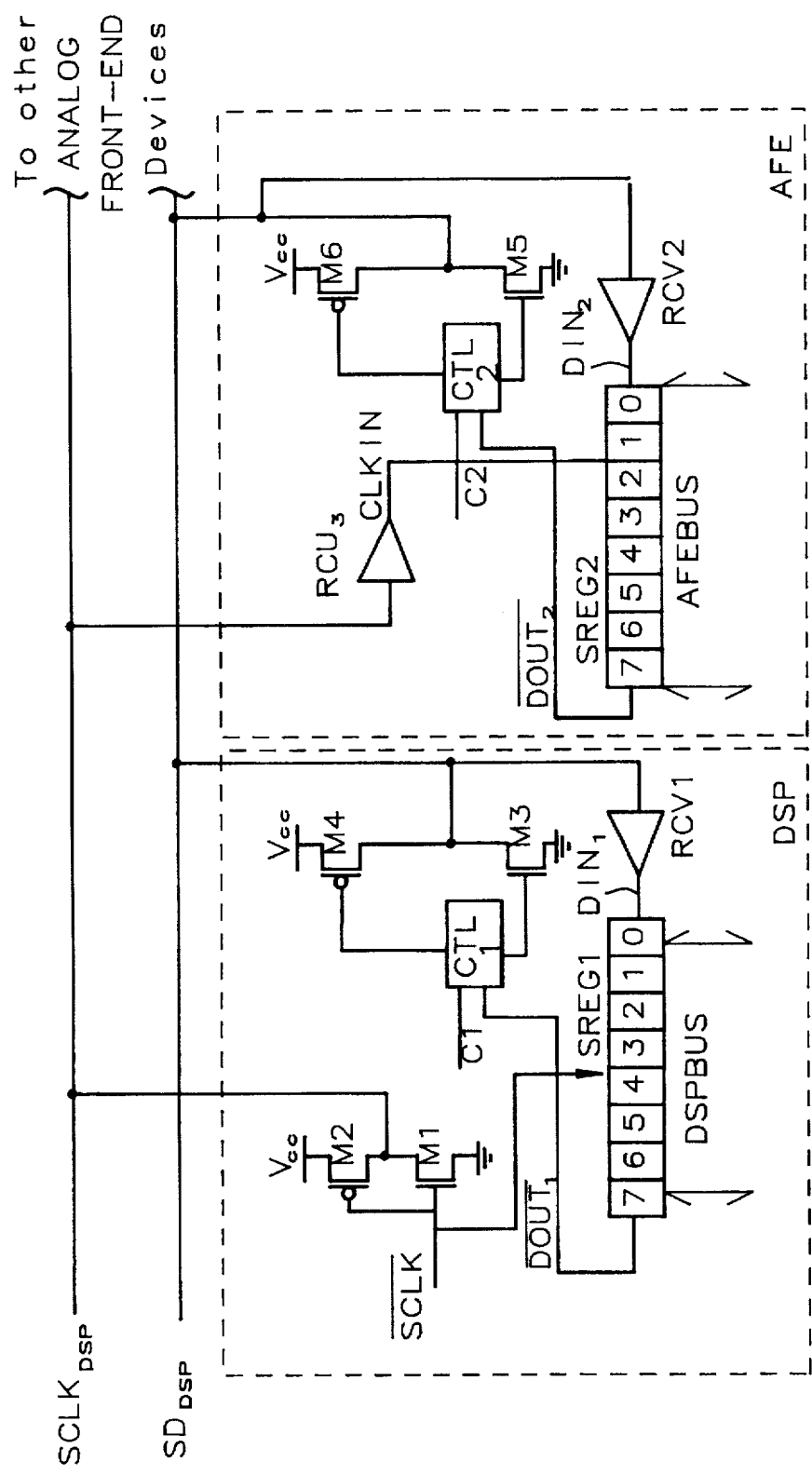
FIG. 3 is a schematic diagram of an embodiment of a serial data interface of this invention.

The circuitry of an implementation of the serial interface of this invention is shown in FIG. 3. The controlling processor DSP has a oscillator to generate the inverted clock signal $\overline{SCLK}$ which is coupled to the gate of the field effect transistors (FET) $M_1$ and $M_2$ and to the shift register SREG1. The drains of FET's $M_1$ and $M_2$ are connected to drive the serial clock $SCLK_{DSP}$.

The shift register SREG1 is capable of accepting data input as parallel data from the controlling processor DSP on the parallel bus DSPbus and output is a serial data stream $DOUT_1$ or it may accept data as serial data stream $DIN_1$ and capable of sending data out in parallel to the controlling processor DSP on the parallel bus DSPbus. To send data to the analog front-end device AFE, the shift register SREG1 shifts its contents to the output $DOUT_1$. The output $DOUT_1$ is coupled through the circuit $CTL_1$ to the gates of FET's $M_3$ and $M_4$. The drains of FET's $M_3$ and $M_4$ are connected to the serial data bus $SD_{DSP}$. The control 5 signal c1 determines the levels of the control signal bits transferred on the serial data bust $SD_{DSP}$. These control signal bits are the start bit at time 4 of FIGS. 2a and 2b; the read/write bit at times 8a and 8b of FIGS. 2a and 2b; the indeterminate levels of time 10 and time 14 of FIGS. 2a and 2b, which both FET's $M_3$ and $M_4$ in a nonconductive state; the stop bit at time 16 of FIGS. 2a and 2b; and the activation of the transfer of the address and serial data of times 6 and 12 of FIGS. 2a and 2b.

When the serial data $D_0, \ldots, D_7$ of time period 12 of FIGS. 2b is to be received from the analog front-end device AFE. The control circuit $CTL_1$ will have the FET's $M_3$ and $M_4$ in a nonconducting state and the serial data $D_0, \ldots, D_7$ of time period 12 of FIGS. 2b will be received from the serial bus $SD_{DSP}$ by the receiver RCV1 and transferred to the serial data input $DIN_1$ of the shift register SREG1. The serial data at the input $DIN_1$ is captured at each transition of the clock $\overline{SCLK}$. The data is transferred from the shift register SREG1 at the end of time period 12 of FIG. 2b to the controlling processor on the bus DSPbus.

The analog front-end device AFE has a receiving circuit RCV3 coupled to the serial clock bus $SCLK_{DSP}$ to buffer the serial clock to create the input clock CLKin to drive the a second shift register SREG2. Shift register SREG2 performs the same function as described for shift register SREG1. The receiving circuit RCV2 is connected to the serial data bus $SD_{DSP}$ to buffer the serial data to create the data input $DIN_2$ to the shift register SREG2.

The information present on the serial data bus $SD_{DSP}$ will be captured at each transition of the input clock CLKin in the shift register SREG2. The data present within the shift register will be transferred to the controlling circuitry of the analog front-end processor AFE. The control circuitry will interpret the information appropriately according to the sequence of the protocol of FIGS. 2a and 2b.

If the address $A_0, \ldots, A_7$ of FIGS. 2a and 2b is not the address of the analog front-end device AFE, but is the address of one of the other analog front-end devices, the analog front-end device AFE will ignore any following information within the serial data protocol.

If the address $A_0, \ldots, A_7$ of FIGS. 2a and 2b is the address of the analog front-end device AFE, the analog front-end device AFE will examine the bit at the time 8a and 8b of FIGS. 2a and 2b. The analog front-end device AFE will prepare during time 10 of FIGS. 2a and 2b to either receive or transmit the serial data to or from the shift register SREG2.

If the level of the serial data bus $SD_{DSP}$ at time 8a of FIG. 2a or 8b FIG. 2bis the first logic level 1, then the analog front-end device is to receive data being transferred from the controlling processor DSP. The signal line C2 will be set such that the circuit CTL2 will place the FET's $M_5$ and $M_6$ in a nonconducting state during time 10 of FIG. 2a. The shift register SREG2 will receive the serial data $D_0, \ldots, D_7$ from the serial data bus $SD_{DSP}$ through the receiver RCV2 during time 12 of FIG. 2. The serial data $D_0, \ldots, D_7$ will be then transferred as parallel data to the control circuitry of the analog front-end device AFE.

If the level of the serial data bus $SD_{DSP}$ at time 8a of FIG. 2a or 8b FIG. 2bis the first logic level 0, then the analog front-end device is to transmit data being transferred to the controlling processor DSP. The shift register SREG2 will receive the parallel data word from the control circuitry of the analog front-end device AFE on the bus AFEbus during the time 10 of FIG. 2b. The control signal $C_2$ will initialize the control circuit CTL2 to allow the output $\overline{DOUT}_2$ to drive the FET's $M_5$ and $M_6$. During the time 12 of FIG. 2b the data in the shift register SREG2 will be scanned to the output $\overline{DOUT}_2$. The FET's $M_5$ and $M_6$ will transfer the serial data word to the serial data bus $SD_{DSP}$.

While this invention has been particularly shown and described with reference to the preferred embodiments thereof, it will be understood by those skilled in the art that various changes in form and details may be made without departing from the spirit and scope of the invention.

What is claimed is:

1. A system for a synchronous transmission and a synchronous reception of a serial digital data protocol between a controlling processor and a plurality of analog front-end devices, comprising:

a) a system clocking unit within the controlling processor to generate a reference clock signal having equal repetitive periods to synchronize the synchronous transmission and the synchronous reception of the serial digital data protocol;

b) a system clocking transmission medium coupled between the controlling processor and the plurality of analog front-end devices to transport the reference clock signal from the system clocking unit to the plurality of analog front-end devices;

c) a system data control unit with the controlling processor to generate the serial digital data protocol wherein said serial digital data protocol has;

a start bit time of one period of the reference clock signal indicating the beginning of a serial digital data protocol transfer, an address bit time for the transmission by the controlling processor of a plurality of serial address bits wherein said plurality of serial address bits forms a digital code identifying each of the plurality of analog front-end devices, a command bit time having one period of the reference clock signal wherein a command bit will direct a specific analog front-end device as specified by the plurality of serial address bits to receive a serial data word if the command bit is at a first logical level and to transmit the serial data word if the command bit is at a second level, a first high impedance time of at least one period of the reference clock signal, to allow the specific analog front end device to select between the synchronous transmission and the synchronous reception so as to prevent contention between said specific analog front end device and said controlling processor, a serial data word time where in a plurality of data bits form the serial data word and each bit has a period of one period of the reference clock signal, and wherein if the specified analog front-end device has been selected for the synchronous reception, said serial data word is dispatched from the controlling processor to the specified analog front-end device, and if the specified analog front-end device has been selected for synchronous transmission, said serial data word will be dispatched from the specified analog front-end device to the controlling processor, a second high impedance time of at least one period of the reference clock signal for the specified analog front-end device to return to synchronous reception so as to prevent contention between said specific analog front end device and said controlling processor, and a serial stop bit time of at least one period of the reference clock signal to transmit a stop bit from the controlling processor to indicate the termination of the serial data protocol;

d) a system data transmission medium coupled between the controlling processor and the plurality of analog front-end devices to transport the serial digital data protocol from the system data control unit to the plurality of analog front-end devices and to transport the serial data word from the specified analog front-end device to the controlling processor; and e) an analog front-end control unit within each of the plurality of analog front-end devices coupled to the system clocking transmission medium to receive the reference clock signal, and coupled to the system data transmission medium to receive the serial data protocol, decode the plurality of address bits, and within the specified analog front-end device, receive the serial data word if the command bit is at the first logical level and to transmit the serial data word if the command bit is at the second logic level.

2. The system of claim 1 wherein the controlling processor may be a digital signal processor.

3. The system of claim 1 wherein the system clocking transmission medium and the system data transmission medium may each have one wire connecting the controlling processor to the plurality of analog front-end devices.

4. The system of claim 1 wherein the plurality of address bits may have an address parity bit appended to allow the detection of a single error within the plurality of address bits.

5. The system of claim 1 wherein the serial data word may further comprise a data parity bit appended to allow the detection of a single error within the serial data word.

6. A circuit to synchronously control, synchronously transmit, and synchronously receive a serial digital data stream between a controlling processor and a plurality of slave devices, comprising:

a) a serial clocking unit within the controlling processor to generate a reference clock signal having equal repetitive periods to synchronize the synchronous transmission and the synchronous reception of the serial digital data stream;

b) a serial clocking transmission medium coupled between the controlling processor and the plurality of slave devices to transport the reference clock signal from the system clocking unit to the plurality of slave devices;

c) a processor data control unit within the controlling processor to generate the serial digital data stream wherein said serial digital data stream has:

a start bit of one period of the reference clock signal indicating the beginning of a serial digital data stream transfer, an address word, transmitted by the controlling processor, comprising of a plurality of serial address bits wherein said address word forms a digital code identifying each of the plurality of slave devices, a command bit having one period of the reference clock signal wherein a command bit will direct a specific slave device as specified by the plurality of serial address bits to receive a data word if the command bit is at a first logical level and to transmit the serial data word if the command bit is at a second level, a first high impedance bit of a least one period of the reference clock signal, to allow the specific slave device to select between the synchronous transmission and the synchronous reception, a serial data word comprising a plurality of data bits wherein each bit of the plurality of data bits has a period of one period of the reference clock signal, and wherein if the specified slave device has been selected for the synchronous reception, said serial data word is dispatched from the controlling processor to the specified slave device, and if the specified slave device has been selected for synchronous transmission, said serial data word will be dispatched from the specified slave device to the controlling processor, second high impedance bit of at least one period of the reference clock signal for the specified slave device to return to synchronous reception, and a serial stop bit of at least one period of the reference clock signal to transmit a stop bit from the controlling processor to indicate the termination of said serial data protocol;

d) a serial data transmission medium coupled between the controlling processor and the plurality of slave devices to transport the serial digital data stream from the processor data control unit to the plurality of slave devices and to transport the serial digital data word from the specified slave device to the controlling processor; and e) a slave control unit within each of the plurality of slave devices coupled to the system clocking transmission medium to receive the reference clock signal, and coupled to the system data transmission medium to receive the serial data stream, decode the plurality of address bits, and within the specified slave device, receive the serial data word if the command bit is at the first logical level and to transmit the serial data word if the command bit is at the second logic level.

7. The circuit of claim 6 wherein the controlling processor may be a digital signal processor.

8. The circuit of claim 6 wherein the serial clocking transmission medium and the processor data transmission medium may each have one wire connecting the controlling processor to the plurality of slave devices.

9. The system of claim 6 wherein the address word may further comprise an address parity bit to allow the detection of a single error within the plurality of address bits.

10. The system of claim 6 wherein the serial data word may further comprise a data parity bit appended to allow the detection of a single error within the serial data word.

11. A synchronous serial data transmission protocol for the exchange of digital data between a controlling processor and a plurality slave devices, comprising:
   a) a start bit of one period of the reference clock signal indicating the beginning of a serial digital data stream transfer;
   b) a n address word, transmitted by the controlling processor, comprising of a plurality of serial address bits and an address parity bit, wherein said address word forms a digital code identifying each of the plurality of slave devices, and wherein each bit of the plurality of address bits and the address parity bit has a period of one period of the reference clock signal;
   c) a command bit having one period of the reference clock signal wherein a command bit will direct a specific slave device as specified by the plurality of serial address bits to receive a data word if the command bit is at a first logical level and to transmit the serial data word if the command bit is at a second level,
   d) a first high impedance bit of a least one period of the reference clock signal, to allow the specific slave device to select between the synchronous transmission and the synchronous reception;
   e) a serial data word comprising a plurality of data bits and a data parity bit, wherein each bit has a period of one period of the reference clock signal, and wherein if the specified slave device has been selected for the synchronous reception, said serial data word is dispatched from the controlling processor to the specified slave device, and if the specified slave device has been selected for synchronous transmission, said serial data word will be dispatched from the specified slave device to the controlling processor;
   f) a second high impedance bit of at least one period of the reference clock signal for the specified slave device to return to a high impedance state to prevent contention between the plurality of slave devices and the controlling processor;
   g) an acknowledge bit of at least one period of the reference clock signal for the specified slave device to transmit an acknowledge signal, if the serial data word has been properly received and to not transmit the acknowledge signal, if the serial data word has not been received properly by the slave device
   h) a third high impedance bit of at least one period of the reference clock signal for the specified slave device to return to a high impedance state to prevent contention between the plurality of slave devices and the controlling processor;
   i) a serial stop bit of at least one period of the reference clock signal to transmit a stop bit from the controlling processor to indicate the termination of the serial data protocol.

12. The protocol of claim 11 wherein said protocol is synchronized by a reference clocking signal having equal repetitive periods to synchronize the synchronous transmission and the synchronous reception of the serial digital data stream, wherein said reference clocking signal is generated in a serial clocking unit within the controlling processor.

13. The protocol of claim 12 wherein the reference clocking signal is transmitted on a serial clocking transmission medium coupled between the controlling processor and the plurality of slave devices to transport the reference clock signal from the system clocking unit to the plurality of slave devices.

14. The protocol of claim 12 wherein said protocol is generated in a processor data control unit within the controlling processor.

15. The protocol of claim 14 wherein a serial data transmission medium coupled between the controlling processor and the plurality of slave devices to transport said protocol from the processor data control unit to the plurality of slave devices and to transport the serial digital data word from the specified slave device to the controlling processor.

16. The protocol of claim 12 wherein a slave control unit within each of the plurality of slave devices coupled to the serial clocking transmission medium to receive the reference clock signal, and coupled to the system data transmission medium to receive the serial data stream, decode the plurality of address bits, and within the specified slave device, receive the serial data word if the command bit is at the first logical level and to transmit the serial data word if the command bit is at the second logic level.

17. The protocol of claim 12 wherein the address parity bit will allow the detection of a single error in the address word.

18. The protocol of claim 12 wherein the data parity bit will allow the detection of a single error in the serial data word.

19. The protocol of claim 12 wherein the controlling processor may be a digital signal processor.

20. The protocol of claim 12 wherein the serial clocking transmission medium and the processor data transmission medium may each have one wire connecting the controlling processor to the plurality of slave devices.

* * * * *